United States Patent
Kreuder et al.

(10) Patent No.: US 6,361,884 B1
(45) Date of Patent: Mar. 26, 2002

(54) PARTIALLY CONJUGATED POLYMERS WITH SPIRO CENTERS AND THEIR USE AS ELECTRO-LUMINESCENT MATERIALS

(75) Inventors: Willi Kreuder, Mainz; Hubert Spreitzer, Frankfurt, both of (DE)

(73) Assignee: Covian Organic Semiconductor GmbH (DE)

( * ) Notice: Subject to any disclaimer, the term of this patent is extended or adjusted under 35 U.S.C. 154(b) by 0 days.

(21) Appl. No.: 09/125,620

(22) PCT Filed: Feb. 7, 1997

(86) PCT No.: PCT/EP97/00551

§ 371 Date: Aug. 21, 1998

§ 102(e) Date: Aug. 21, 1998

(87) PCT Pub. No.: WO97/31048

PCT Pub. Date: Aug. 28, 1997

(30) Foreign Application Priority Data

Feb. 22, 1996 (DE) .......................... 196 06 511

(51) Int. Cl.[7] .................. H05B 33/14; C09K 11/06; C08G 61/00
(52) U.S. Cl. .................. 428/690; 428/917; 313/504; 257/40; 252/301.35; 528/397; 528/403; 528/412; 528/423
(58) Field of Search .................. 428/690, 917; 313/504, 506; 257/40; 252/301.16, 301.35; 528/397, 403, 412, 423

(56) References Cited

U.S. PATENT DOCUMENTS

| | | |
|---|---|---|
| 3,995,299 A | 11/1976 | Partridge .................. 357/8 |
| 5,621,131 A | 4/1997 | Kreuder et al. .......... 558/46 |
| 5,840,217 A | 11/1998 | Lupo et al. .............. 252/583 |
| 6,132,641 A * | 10/2000 | Rietz et al. ........... 252/301.16 |

FOREIGN PATENT DOCUMENTS

| | | |
|---|---|---|
| DE | 2545784 | 7/1976 |
| EP | 0676461 | 10/1995 |
| EP | 0707020 | 4/1996 |
| WO | 90/13148 | 11/1990 |
| WO | 97/20877 | 6/1997 |

OTHER PUBLICATIONS

Sokolik, I., et al, *J. Appl. Phys. 74:* 3584–3586, Sep. 1, 1993.

* cited by examiner

*Primary Examiner*—Marie Yamnitzky
(74) *Attorney, Agent, or Firm*—Connolly Bove Lodge & Hutz LLP

(57) ABSTRACT

A partially conjugated polymer comprises repeating units of the formula (I),

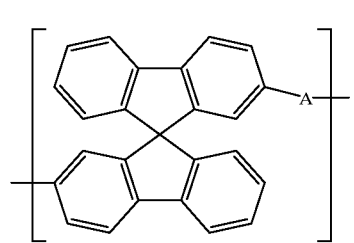

(I)

where the symbols have the following meanings:

A are identical or different and are each from zero to eight identical or different arylene and/or heteroarylene and/or vinylene and/or acetylene groups which, like the spirobifluorene framework, may be substituted or unsubstituted. Polymers comprising repeating units of the formula (I) are suitable, for example, as electroluminescence materials. They display, inter alia, a high color purity of the emission, good film-forming properties and a high solubility.

10 Claims, No Drawings

PARTIALLY CONJUGATED POLYMERS WITH SPIRO CENTERS AND THEIR USE AS ELECTRO-LUMINESCENT MATERIALS

There is a great industrial need for large-area, solid-state light sources for a number of applications, predominantly in the field of display elements, VDU technology and lighting engineering. The demands made of these light sources can at present not be met fully satisfactorily by any of the existing technologies.

As alternatives to conventional display and lighting elements, e.g. incandescent lamps, gas discharge lamps and non-self-illuminating liquid crystal display elements, use has for some time been made of electroluminescence (EL) materials and devices, e.g. light emitting diodes (LEDs).

DE-A 25 45 784 (corresponds to U.S. Pat. No. 3,995, 299) describes an electroluminescence device having a radiation source which comprises a layer of an amorphous or predominantly amorphous polymer material having appreciable electrical charge mobility and a low ionization potential, a strong electron donor, a strong electron acceptor and preferably at least one luminescent additive; electrical connections via which an electric current can be passed through the thickness of the layer for exciting radiation therefrom are provided.

Polymer materials which have been used are both conjugated polymers such as poly(p-phenylene-vinylene) (see, for example, WO-A 90/13148) and non-conjugated polymers (see, for example, I. Sokolik et al., J. Appl. Phys. 1993, 74, 3584); conjugated materials generally have the advantage of a higher charge carrier mobility and thus better efficiency and lower operating voltages. In addition, the thermal stability of the last-named polymers is not at all satisfactory. This type of polymer also leads to broad emission bands, which is equivalent to low color purity.

Apart from devices based on polymers, electroluminescence devices based on low molecular weight organic compounds have also been known for some time. EP-A-0 676 461 describes such devices comprising spiro compounds as electroluminescence materials.

Although good results have been achieved using these materials, the property profile of such compounds is still quite capable of improvement.

Since, in addition, the development of electroluminescence materials, in particular those based on polymers, can in no way be regarded as having been concluded, the manufacturers of lighting and display devices are interested in a wide variety of electroluminescence materials for such devices.

This is due, inter alia, to the fact that only the interaction of the electroluminescence materials with the further components of the devices allows conclusions to be drawn as to the quality of the electroluminescence material.

It is therefore an object of the present invention to provide new electroluminescence materials which, when used in lighting or display devices, are capable of improving the property profile of these devices.

It has now surprisingly been found that certain partially conjugated polymers having spiro centers are particularly suitable as electroluminescence materials and, in particular, have excellent processability.

The invention accordingly provides a partially conjugated polymer comprising repeating units of the formula (I),

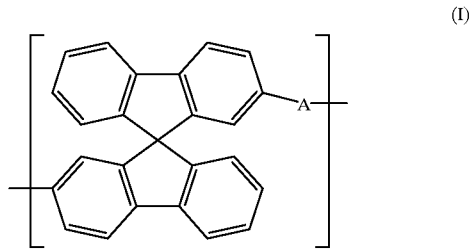

where the symbols have the following meanings:

A are identical or different and are each from zero to eight identical or different arylene and/or heteroarylene and/ or vinylene and/or acetylene groups which, like the spirobifluorene framework, may be substituted or unsubstituted.

The polymers of the invention preferably comprise from 2 to 1000, particularly preferably from 2 to 100, in particular from 2 to 40, repeating units of the formula (I).

The polymers of the invention preferably consist of repeating units of the formula (I).

Preference is given to homopolymers, but likewise to copolymers, i.e. polymers in which the group A in the individual repeating units has different meanings or the spirobifluorene framework is substituted differently. Such copolymers preferably comprise from 2 to 5 different monomers, particularly preferably 2 or 3.

Such copolymers which have further structural units in addition to structural units of the formula (I) preferably comprise at least 50% by weight of structural elements of the formula (I).

The arylene or heteroarylene units are generally aromatic systems having from 2 to 20 carbon atoms.

Preferred substituents are straight-chain, cyclic or branched alkyl, alkoxy or ester groups having from 1 to 22 carbon atoms, aryl and/or aryloxy groups preferably having from 2 to 20 carbon atoms, preferably phenyl and/or phenyloxy groups, where the aromatic may bear $C_1$–$C_{22}$-alkyl, $C_1$–$C_{22}$-alkoxy, Br, Cl, F, CN, $CO_2R$, $SO_3R$ and/or $P(O)(OR)_2$ as substituents, Br, Cl, F, CN, $CO_2R$, $SO_3R$, $P(O)(OR)_2$ and $CF_3$. Here, R is H or a straight-chain or branched alkyl group having from 1 to 22 carbon atoms or a singly charged cation, preferably alkali metal such as Na or K, or a tetraalkylammonium group such as $N(butyl)_4$.

The aryl and heteroaryl groups in the group A preferably have zero, one or two substituents. The individual six-membered rings of the spirobifluorene preferably have zero or one substituent.

The group A preferably consists of from 1 to 6, particularly preferably from 2 to 4, of the abovementioned groups.

The polymers of the invention display, in particular, a high color purity of the emission, good film-forming properties and good solubility in at least one organic solvent having a boiling point of from 30 to 300° C.

For the purposes of the invention, a polymer is a compound whose electroluminescence spectrum remains essentially unchanged on adding further repeating units.

Preference is furthermore given to polymers in which the group A in the formula (I) comprises the following molecular building blocks:

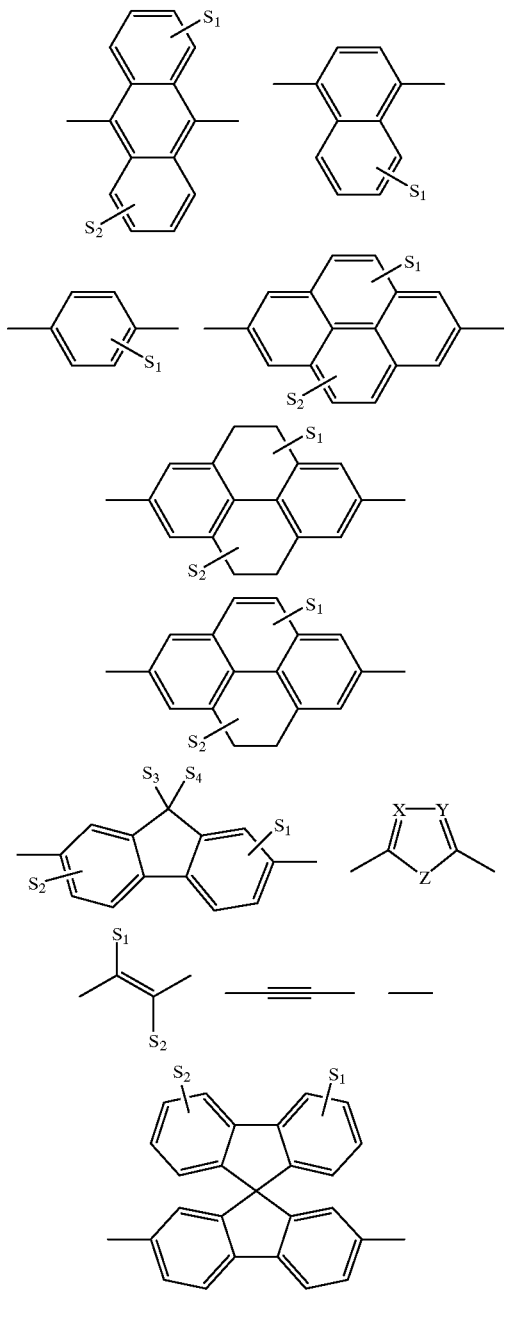

where $S_1$, $S_2$, $S_3$ and $S_4$ are identical or different and are H or the above-described preferred substituents;

X, Y are identical or different and are $CS_1$, N;

Z are identical or different and are —O—, —S—, —$NS_1$—, —$CS_1S_2$—, —$CS_1=CS_1$—, —$CS_1=N$—, where $S_1$, $S_2$ are H or the above-described preferred substituents.

Particular preference is given to polymers in which the group A in the formula (I) has the following meanings:

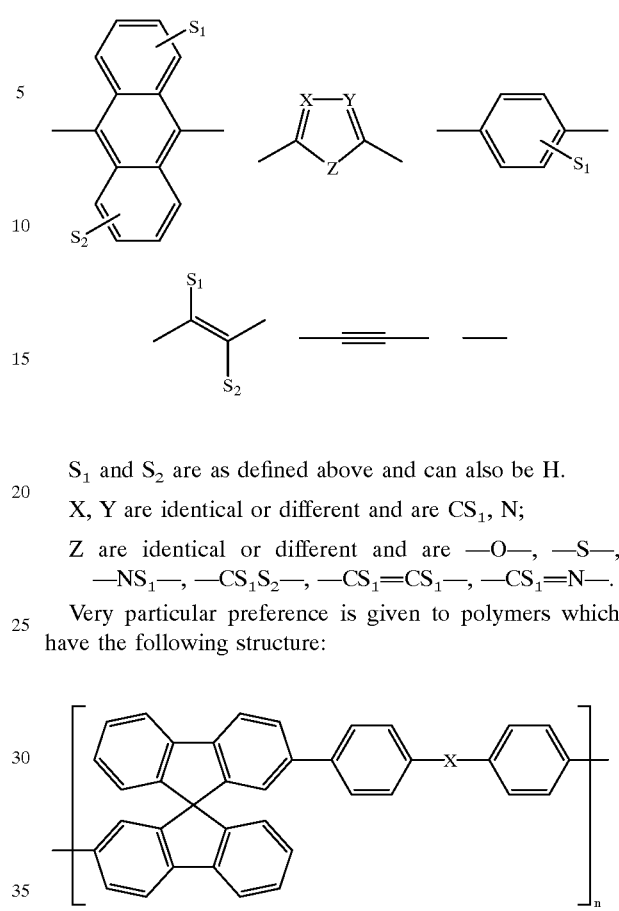

$S_1$ and $S_2$ are as defined above and can also be H.

X, Y are identical or different and are $CS_1$, N;

Z are identical or different and are —O—, —S—, —$NS_1$—, —$CS_1S_2$—, —$CS_1=CS_1$—, —$CS_1=N$—.

Very particular preference is given to polymers which have the following structure:

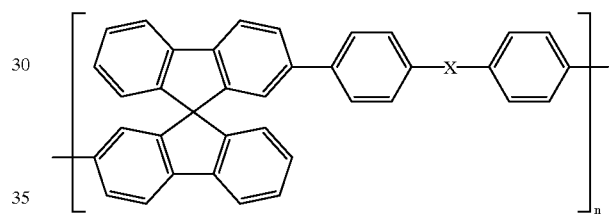

where X has the following meanings:

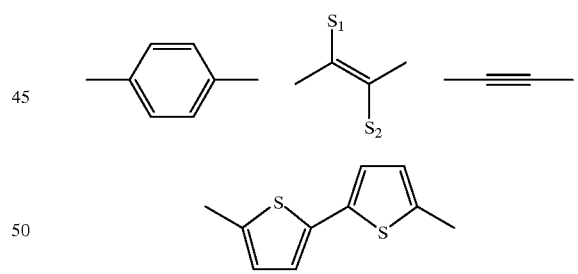

chemical bond

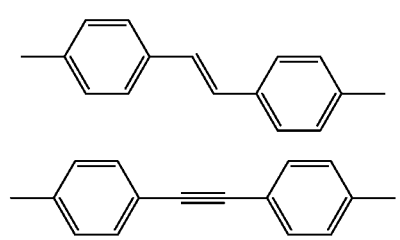

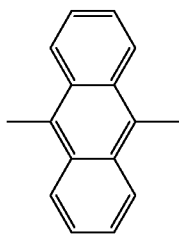

and

S₁ and S₂ are as defined above and can also be H;

n is a natural number from 2 to 1000.

Such polymers are particularly well suited to achieving a blue electroluminescence.

The polymers of the invention can be prepared by literature methods known per se as are described in standard works on organic synthesis, e.g. Houben-Weyl, Methoden der Organischen Chemie, Georg-Thieme-Verlag, Stuttgart or J. March, Advanced Organic Chemistry, Fourth Ed., John Wiley & Sons, New York 1992.

The preparation is carried out under reaction conditions which are known and suitable for the reactions mentioned. It is also possible to make use of variants which are known per se and are not mentioned more specifically here.

Starting compounds used for the preparation of the polymers of the invention are, in general, monomers which have a 9,9'-spirobifluorene center and in the 2,2' positions bear substituents which make a polymerization reaction possible and, if desired, in any other positions may bear further substituents which do not interfere with this reaction.

Methods of synthesizing these monomers are preferably based on the synthesis of 9,9'-spirobifluorene, which is described in the abovementioned literature references, and on further substitution reactions on this basic molecule which are generally customary and can be carried out without problems by those skilled in the art.

Less preferred, but naturally also possible, is building up spirobifluorene derivatives which are already appropriately functionalized, starting from appropriately substituted precursors.

Functionalizations of 9,9'-spirobifluorene are described, for example, in J. H. Weisburger, E. K. Weisburger, F. E. Ray, *J. Am. Chem. Soc.* 1959, 72, 4253; F. K. Sutcliffe, H. M. Shahidi, D. Paterson, *J. Soc. Dyers Colour* 1978, 94, 306; and G. Haas, V. Prelog, *Helv. Chim. Acta* 1969, 52, 1202. The electrophilic aromatic substitution reactions described therein lead, under appropriately selected conditions and stoichiometries, to the synthesis of 2,2'-bifunctionalized spirobifluorene derivatives (e.g. 2,2'-dihalo-9,9'-spirobifluorene, 2,2'-diacetyl-9,9'-spirobifluorene, 2,2'-diformyl-9,9'-spirobifluorene, 2,2'-dinitro-9,9'-spirobifluorene). These can then be converted into further derivatives by methods known to those skilled in the art (e.g. halogen to cyano (p. 594 ff.), nitro to amino (p. 1103 ff.), acetyl to carboxy (p. 1065 ff.) and further to the carboxylic acid chloride (p. 388 ff.) (the page references refer to J. March, Advanced Organic Chemistry, Third Ed., John Wiley & Sons, New York). Further substitution can then be carried out, preferably in the 7,7' and 4,4' positions, by means of subsequent reactions.

For the synthesis of group A, reference may be made, for example, to DE-A 23 44 732, 24 50 088, 24 29 093, 25 02 904, 26 36 684, 27 01 591 and 27 52 975 for compounds comprising 1,4-phenylene groups; DE-A 26 41 724 for compounds comprising pyrimidine-2,5-diyl groups; DE-A 40 26 223 and EP-A 0 391 203 for compounds comprising pyridine-2,5-diyl groups; DE-A 32 31 462 for compounds comprising pyridazine-3,6-diyl groups; N. Miyaura, T. Yanagi and A. Suzuki, Synthetic Communications 1981, 11, 513; DE-C 3930663; M. J. Sharp, W. Cheng, V. Snieckus, Tetrahedron Letters 1987, 28, 5093; G. W. Gray, J.Chem.Soc. Perkin Trans II 1989, 2041 and Mol. Cryst. Liq. Cryst. 1989, 172, 165; Mol. Cryst. Liq. Cryst. 1991, 204, 43 and 91; EP-A 0 449 015; WO 89/12039; WO 89/03821; EP-A 0 354 434 for the direct linkage of aromatics and heteroaromatics.

The preparation of disubstituted pyridines, disubstituted pyrazines, disubstituted pyrimidines and disubstituted pyridazines is described, for example, in the appropriate volumes of the series "The Chemistry of Heterocyclic Compounds" by A. Weissberger and E. C. Taylor (editors).

Starting from the abovementioned monomers, the polymerization to give the polymers of the invention can be carried out by a number of methods.

For example, derivatives of 9,9'-spirobifluorene can be polymerized oxidatively (e.g. using FeCl₃, see, inter alia, P. Kovacic, N. B. Jones, *Chem. Ber.* 1987, 87, 357; M. Weda, T. Abe, H. Awano, *Macromolecules* 1992, 25, 5125) or electrochemically (see, for example, N. Saito, T. Kanbara, T. Sato, T. Yamamoto, *Polym. Bull.* 1993, 30, 285).

Likewise, the polymers of the invention can be prepared from 2,2'-difunctionalized 9,9'-spirobifluorene derivatives. Dihaloaromatics can be polymerized in the presence of copper/triphenylphosphine catalysts (see, for example, G. W. Ebert, R. D. Rieke, *J. Org. Chem.* 1988, 53, 4482).

Aromatic diboronic acids and aromatic dihalides or mixed aromatic haloboronic acids can be polymerized by means of coupling reactions in the presence of palladium catalysts (see, for example, M. Miyaura, T. Yanagi, A. Suzuki, *Synth. Commun.* 1981, 11, 513; R. B. Miller, S. Dugar, *Organometallics* 1984, 3, 1261).

Aromatic distannanes can be polymerized in the presence of palladium catalysts as described, for example, in J. K. Stille, Angew. *Chem. Int. Ed. Engl.* 1986, 25, 508.

Furthermore, the abovementioned dihalo compounds can be converted into the dilithio or digrignard compounds which can then be polymerized with further dihalo compound by means of CuCl₂ (see, for example, G. Wittig, G. Klar, *Liebigs Ann. Chem.* 1967, 704, 91; H. A. Staab, F. Bunny, *Chem. Ber.* 1967, 100, 293; T. Kaufmann, *Angew. Chem.* 1974, 86, 321–354) or by electron transfer of unsaturated 1,4-dihalo compounds (see, for example, S. K. Taylor, S. G. Bennett, K. J. Harz, L. K. Lashley, *J. Org. Chem.* 1981, 46, 2190).

Preference is given to the preparation of polymers comprising repeating units of the formula (I) by polymerization of corresponding dihalo compounds in the presence of Ni⁰ catalysts. This method of polymerization is described, for example, in M. Kreyenschmidt et al., Macromolecules 1995, 28, 4577.

The invention therefore also provides a process for preparing partially conjugated polymers comprising repeating units of the formula (I),

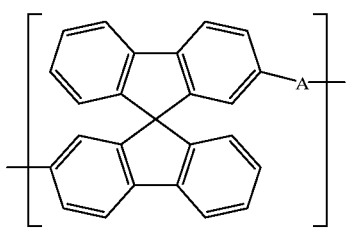

(I)

where the symbols are as defined above, which comprises polymerizing one or more compounds of the formula (II)

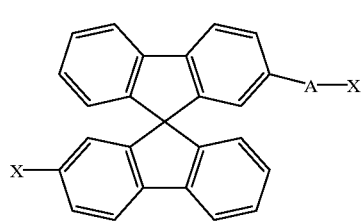

(II)

where

X is Cl, Br, I and the other symbols have the same meanings as in the formula (I), in an inert organic solvent in the presence of Ni⁰ at a temperature of from 30 to 150° C.

Suitable catalysts are $Ni^0$ compounds such as $Ni(cod)_2$ (cod=1,5-cyclooctadiene), $Ni(PPh_3)_4$, or nickel(II) salts in combination with a reducing agent such as $NiCl_2/Zn/PPh_3$ or $NiCl_2(PPh_3)_2/Zn$.

The catalyst is generally used in amounts of 0.1–20 mol %, based on the dihalo compound; preference is given to from 5 to 15 mol %, particular preference to about 10 mol %.

Suitable solvents are weakly polar or polar aprotic organic solvents or mixtures of these. Preference is given to ethers such as THF and diphenyl ether, aromatic hydrocarbons such as toluene, dialkylamides such as dimethylformamide and dimethylacetamide and mixtures thereof.

The reaction is generally carried out at temperatures of from 30 to 150° C., preferably from 50 to 120° C. The reaction time is generally from 1 to 7 days.

The work-up can be carried out by the customary methods known to those skilled in the art.

The synthesis of the polymers of the invention can, however, also be carried out by polymerization of a 2,2'-difunctionalized 9,9'-spirobifluorene derivative with a further, appropriately difunctionalized compound.

Thus, for example, 2,2'-dibromo-9,9'-spirobifluorene can be polymerized with 4,4'-biphenylbisboronic acid. In this way, it is possible, simultaneously with the polymerization step, to build up various heterocyclic units, for example the formation of oxadiazole units from difunctional carboxylic acid halides and difunctional carboxylic hydrazides, from the corresponding dicarboxylic acid and hydrazine sulfate (B. Schulz, E. Leibnitz, *Acta Polymer* 1992, 43, 343; JP-A 05/178990) or from dicarboxylic acid halides and bistetrazoles (C. A. Abshire, C. S. Marvel, *Makromol. Chem.* 1961, 44, 388).

To prepare copolymers, it is possible, for example, to polymerize different compounds comprising structural elements of the formula (I) with one another or to polymerize one or more compounds comprising structural elements of the formula (I) with one or more further difunctional molecules selected from the group consisting of oligovinylenes, oligoacetylenes, oligoarylenes, oligoheteroarylenes, oligoarylene-vinylenes or oligoarylene-acetylenes.

The work-up is carried out by known methods with which those skilled in the art are familiar, as are described, for example, in D. Braun, H. Cherdron, W. Kern, Praktikum der makromolekularen organischen Chemie, 3rd edition, Hüthig Verlag, Heidelberg, 1979, p. 87 ff. or R. J. Young, P. A. Lovell, Introduction to Polymers, Chapman & Hall, London 1991. For example, the reaction mixture can be filtered, diluted with aqueous acid, extracted and the crude product obtained after drying and evaporation of the solvent can be further purified by reprecipitation.

Terminal bromine atoms can, for example, be removed reductively using $LiAlH_4$ (see, for example, J. March, Advanced Organic Chemistry, Third Ed., John Wiley & Sons, p. 510).

The polymers of the invention can be used as electroluminescence materials.

The invention therefore also provides for the use of polymers comprising repeating units of the formula (I) as electroluminescence material.

For the purposes of the invention, electroluminescence materials are materials which can be used as active layer in an electroluminescence device. Active layer means that the layer is capable of emitting light on application of an electric field (light-emitting layer) and/or that it improves the injection and/or the transport of the positive and/or negative charges (charge injection layer or charge transport layer).

The invention therefore also provides an electroluminescence material comprising one or more polymers which comprise repeating units of the formula (I).

The electroluminescence material of the invention usually comprises one or more polymers of the invention, either as main component, i.e. in an amount of more than 50% by weight, or as additive.

To be used as electroluminescence materials, the polymers of the invention are applied, from solutions, in the form of a film to a substrate, in general by known methods with which those skilled in the art are familiar, e.g. casting, dipping, printing or spin coating. This process generally takes place in the temperature range from –20 to +300° C., preferably in the range from 10 to 100° C. and particularly preferably from 15 to 50° C.

The invention therefore further provides a process for producing an electroluminescence material, which comprises applying a polymer comprising repeating units of the formula (I) in the form of a film to a substrate.

The invention additionally provides an electroluminescence device comprising one or more active layers, wherein at least one of these active layers comprises one or more polymers of the invention. The active layer can, for example, be a light-emitting layer and/or a transport layer and/or a charge injection layer.

The general structure of such electroluminescence devices is described, for example, in U.S. Pat. Nos. 4,539,507 and 5,151,629. Polymer-containing electroluminescence devices are described, for example, in WO 90/13148 or EP-A 0 443 861.

They usually comprise an electroluminescent layer between a cathode and an anode, with at least one of the electrodes being transparent. In addition, one or more electron injection layers and/or electron transport layers can be inserted between the electroluminescent layer and the cathode and/or one or more hole injection layers and/or hole transport layers can be inserted between the electroluminescent layer and the anode. Cathode materials employed are preferably metals or metallic alloys, e.g. Ca, Mg, Al, In, Mg/Ag. As anode, it is possible to employ metals, e.g. Au, or other materials having metallic conductivity, e.g. oxides such as ITO (indium oxide/tin oxide), on a transparent substrate, e.g. of glass or a transparent polymer.

In operation, the cathode is placed at a negative potential relative to the anode and electrons from the cathode are injected into the electron injection layer/electron transport layer or directly into the light-emitting layer. At the same time, holes from the anode are injected into the hole injection layer/hole transport layer or directly into the light-emitting layer.

The injected charge carriers move toward one another through the active layers under the action of the applied voltage. This leads to electron/hole pairs at the interface between charge transport layer and light-emitting layer or within the light-emitting layer and these pairs recombine with emission of light. The color of the emitted light can be varied by means of the materials used as light-emitting layer.

Electroluminescence devices are employed, for example, as self-illuminating display elements such as control lamps, alphanumeric displays, signs, and in optoelectronic couplers.

The present application cites various documents, for example to illustrate the technical background of the invention. All these documents are hereby expressly incorporated by reference into the present application. The contents of the german patent application 196 065 11.9, whose priority is claimed by the present application, and also the abstract of the present application are hereby expressly incorporated by reference into the present application:

The invention is illustrated by the examples without being limited thereby.

EXAMPLES

A Monomer Syntheses

Example 1

Synthesis of 2,2'-dibromo-9,9'-spirobifluorene 3.26 g of 9,9'-spirobifluorene (10.3 mmol) dissolved in 50 ml of $CH_2Cl_2$ are admixed at room temperature with 1.12 ml of bromine (21.8 mmol) and a spatula tip of $SnCl_2$. The mixture is refluxed until the reaction is complete (about 8 hours). The virtually decolorized reaction solution is, after cooling, shaken with aqueous solutions of $Na_2SO_3$ and $NaHCO_3$ and finally with pure water, and subsequently evaporated to about 20 ml. On standing in a freezer, the product crystallizes in the form of white platelets. It can be purified further by recrystallization from $CH_2Cl_2$/n-pentane. Yield: 70–85%.

Melting point: 240° C.

$^1$H-NMR ($CDCl_3$, ppm): 6.65 (d, J=7.8 Hz, 2H, H-8,8'); 6.87 (d, J=1.9 Hz, 2H, H-1,1'); 7.15 (dt, J=7.7, 1.1 Hz., 2H, H-7,7'); 7.35 (dt, J=7.6, 1.2 Hz, 2H, H-6,6'); 7.55 (dd, J=8.2, 1.9 Hz, 2H, H-3,3'); 7.75 (d, J=7.9 Hz, 2 H; H-5,5'); 7.90 (d, J=7.7, 2H, H-4,4').

Example 2

Synthesis of 4,4'-stilbenediboronic acid

A Grignard reagent made from 20.0 g of 4,4'-dibromostilbene (59.2 mmol) is added dropwise under argon in THF to a solution of 16.0 g of trimethyl borate (154 mmol) in THF at –78° C. The reaction mixture is allowed to come to room temperature overnight while stirring and is then poured onto about 100 g of ice and 5 ml of $H_2SO_4$. The mixture is shaken a number of times with $CHCl_3$, the combined organic phases are dried over $Na_2SO_4$ and evaporated. The crude product can be recrystallized from ethanol/$H_2O$. Yield: 60–70%.

The melting point varies greatly as a function of the water content.

$^1$H-NMR ($CD_3OD$, ppm): 7.12 (s, 2H, H-vinyl), 7.38 (d, 4H, H-phenyl), 8.03 (d, 4H, H-phenyl)

4,4'-Tolandiboronic acid and 4,4'-biphenyldiboronic acid can also be prepared by methods analogous to the above procedure. The last-named compound is also commercially available, e.g. from Lancaster Synthesis GmbH, Mühlheim, Germany.

B Polymerizations

Example 3

Polymerization of 2,2'-dibromo-9,9'-spirobifluorene by Means of Ni(0) Using the Method of Yamamoto to Give poly-2,2'-(9,9'-spirobifluoren)ylene (polymer 1)

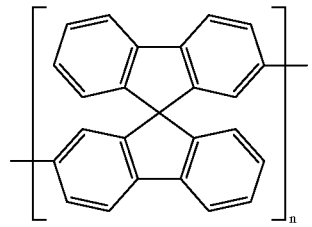

Under argon, a solution of 1.50 g of 2,2'-dibromo-9,9'-spirobifluorene in 300 ml of dry THF is prepared and heated to 60° C. The warm solution is quickly added under protective gas to a refluxing, likewise under protective gas, mixture of 825 mg of Ni(cod)$_2$, 470 mg of 2,2'-bipyridyl and 0.4 ml of 1,5-cyclooctadiene (COD) in 50 ml of dry THF. The polymerization starts immediately, with the deep blue reaction mixture becoming yellow. It is refluxed further for 6 hours and subsequently cooled to room temperature. The reaction solution is evaporated to 50 ml. The yellow polymer is filtered off with suction and washed with THF, dilute hydrochloric acid and water.

The soluble polymer fraction is obtained therefrom by extraction with 200 ml of 1-chloronaphthalene and is purified by shaking with ethylenediaminetetraacetic acid (3×aqueous solution adjusted to pH 7–8 with ammonia, 1×pH 3) and subsequent shaking with dilute hydrochloric acid and water. The dried 1-chloronaphthalene solution is evaporated under reduced pressure to 50 ml and the polymer is precipitated by dropwise addition to 250 ml of methanol. The polymer obtained is virtually colorless (about 0.5 g).

$^1$H-NMR ($C_2D_2Cl_4$, 363 K, ppm): 6.60–6.90 (4H, H-1, 1',8,8'); 7.00–7.10 (2H, H-7,7'); 7.20–7.50 (4H, H-3,3',6,6'); 7.60–7.90 (4H, H4,4',5,5')

Example 4

Polymerization of 2,2'-dibromo-9,9'-spirobifluorene with 4,4'-stilbenediboronic Acid to Give poly[2,2'-(9,9'-spirobifluorelenylene)-4,4'-stilbene] (polymer 2)

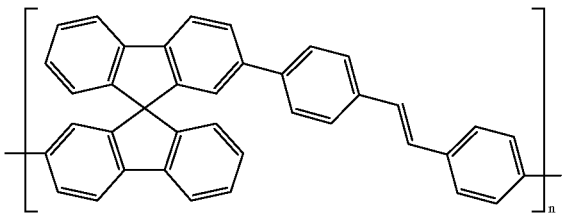

948 mg (2 mmol) of 2,2'-dibromo-9,9'-spirobifluorene and 536 mg (2 mmol) of 4,4'-stilbenediboronic acid are added to a mixture of 100 ml of THF and 40 ml of ethanol. 20 ml of 1 molar aqueous potassium carbonate solution are added thereto. The mixture is refluxed under nitrogen and 50 mg of tetrakis(triphenylphosphine)palladium(0) dissolved in 5 ml of THF are added. After refluxing for 24 hours, the mixture is cooled to room temperature. The pale yellow polymer formed is filtered off with suction, boiled for 2 hours with dilute hydrochloric acid, again filtered off with suction and washed with water until free of acid. Extraction with hot 1,1,2,2-tetrachloroethane gives a soluble polymer fraction (about 0.4–0.6 g).

$^1$H-NMR ($C_2D_2Cl_4$, 363 K, ppm): 6.70–6.95 (4H, H-1, 1',8,8'); 7.10–7.25 (2H, H-7,7'); 7.25–7.50 (14H, H-phenyl, H-vinyl, H-3,3',6,6'); 7.60–8.00 (4H, H-4,4',5,5').

Example 5

Photoluminescence Measurement on poly-2,2'-(9,9'-spirobifluoren)ylene (polymer 1)

A solution of poly-2,2'-(9,9'-spirobifluoren)ylene in chlorobenzene (2 mg/ml) is applied to a quartz support by spin coating at 1000 rpm. On excitation with light having a wavelength of 366 nm, the polymer film displays a blue luminescence ($\lambda_{em}$=415 nm). A comparison with the fluorescence spectrum of the polymer 1 in dilute solution (<10$^{-5}$ mol/l in chlorobenzene) indicates a bathochromic shift of 10 nm for the film with retention of the spectral characteristics of the dilute solution.

Example 6

Photoluminescence Measurement on poly[2,2'-(9,9'-spirobifluorenylene)-4,4'-stilbene] (polymer 2)

A solution of poly[2,2'-(9,9'-spirobifluorenylene)4,4'-stilbene] in tetrachloroethane (3 mg/ml) is applied to a quartz support by spin coating at 1000 rpm. On excitation with light having a wavelength of 366 nm, the polymer film displays a blue luminescence ($\lambda_{em}$=445 nm). A comparison with the fluorescence spectrum of the polymer 2 in dilute solution (<10$^{-5}$ mol/l in tetrachloroethane) indicates a bathochromic shift of 5 nm for the film with retention of the spectral characteristics of the dilute solution.

Example 7

Electroluminescence Device

A chlorobenzene or tetrachloroethane solution of the polymer to be measured (concentration: 3 mg/ml) is applied by spin coating at 1000 rpm under nitrogen to a glass support coated with ITO (indium tin oxide) (structured, strips 2 mm wide). The glass support is transferred via a lock with maintenance of the protective gas atmosphere into a high-vacuum vapor deposition unit. At 2×10$^{-5}$ mbar, Ca strips (or other metals or alloys having suitable work functions) (2 mm wide, 230 nm thick) are vapor deposited onto the polymer layer at right angles to the ITO strips using a mask. The resulting device, ITO/polymer/metal, is placed in a specimen holder and the electrodes are connected via spring connectors to a source of electric power, with an ITO strip being made positive and a Ca strip being made negative. On application of a sufficiently high voltage, an electroluminescence from the appropriate matrix element is observed.

What is claimed is:

1. A partially conjugated polymer comprising repeating units of the formula (I),

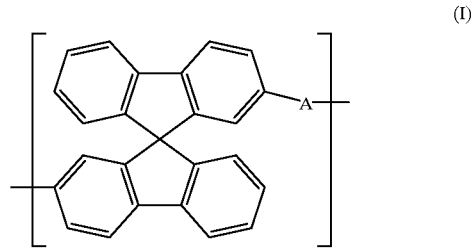

where the symbols have the following meanings:

A are identical or different and are each from zero to eight identical or different arylene and/or heteroarylene and/or vinylene and/or acetylene groups which, like the spirobifluorene framework, are optionally substituted.

2. A polymer as claimed in claim 1, wherein the group A in the formula (I) is:

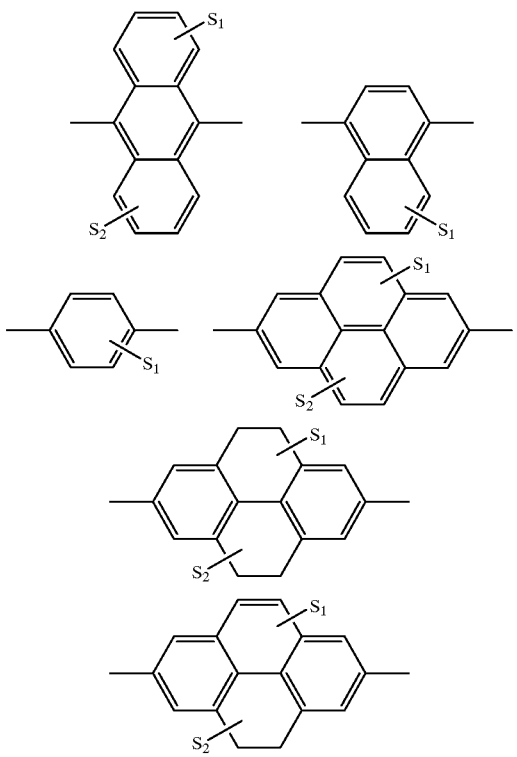

-continued

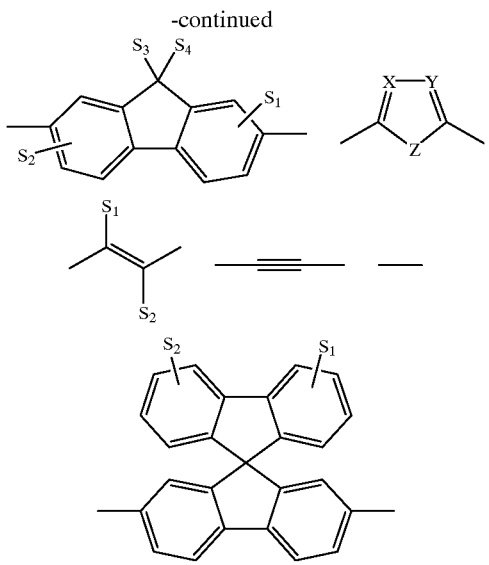

where the symbols have the following meanings:
X, Y are identical or different and are $CS_1$, N;
Z are identical or different and are —O—, —S—, —$NS_1$—, —$CS_1S_2$—, —$CS_1=CS_1$—, —$CS_1=N$—;
$S_1$, $S_2$, $S_3$ and $S_4$ are identical or different and are H or straight-chain, cyclic or branched alkyl, alkoxy or ester groups having from 1 to 22 carbon atoms, aryl and/or aryloxy groups having from 2 to 20 carbon atoms, where the aromatic nuclei thereof optionally bear $C_1$–$C_{22}$-alkyl, $C_1$–$C_{22}$-alkoxy, Br, Cl, F, CN, $CO_2R$, $SO_3R$ and/or $P(O)(OR)_2$ as substituents, Br, Cl, F, CN, $CO_2R$, $SO_3R$, $P(O)(OR)_2$ and $CF_3$; R is H or a straight-chain or branched alkyl group having from 1 to 22 carbon atoms or a singly charged cation.

3. A polymer as claimed in claim 1, wherein the group A in the formula (I) is:

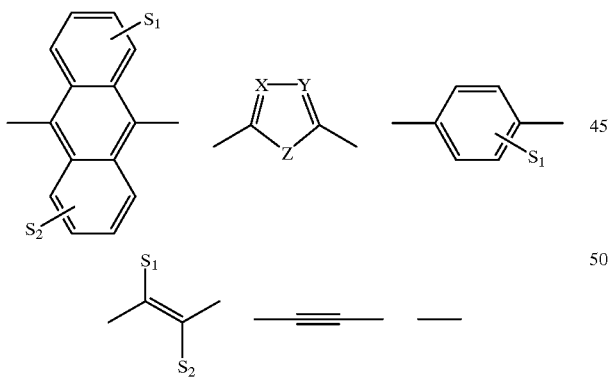

where the symbols have the following meanings:
X, Y are identical or different and are $CS_1$, N;
Z are identical or different and are —O—, —S—, —$NS_1$—, —$CS_1S_2$—, —$CS_1=CS_1$—, —$CS_1=N$—;
$S_1$ and $S_2$ are identical or different and are H or straight-chain, cyclic or branched alkyl, alkoxy or ester groups having from 1 to 22 carbon atoms, aryl and/or aryloxy groups having from 2 to 20 carbon atoms, where the aromatic nuclei thereof optionally bear $C_1$–$C_{22}$-alkyl, $C_1$–$C_{22}$-alkoxy, Br, Cl, F, CN, $CO_2R$, $SO_3R$ and/or $P(O)(OR)_2$ as substituents, Br, Cl, F, CN, $CO_2R$, $SO_3R$, $P(O)(OR)_2$ and $CF_3$; R is H or a straight-chain or branched alkyl group having from 1 to 22 carbon atoms or a singly charged cation.

4. A polymer as claimed in claim 1 which has the following structure,

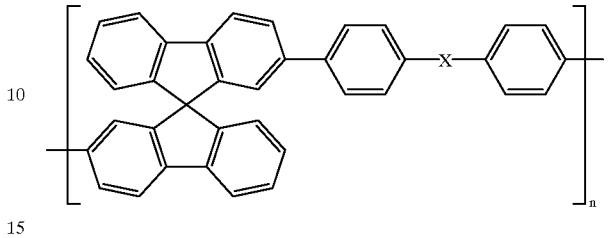

where the symbols have the following meanings:
X is

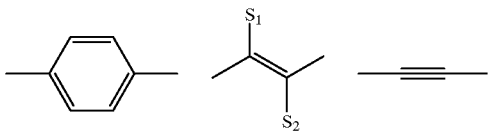

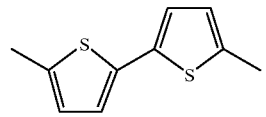

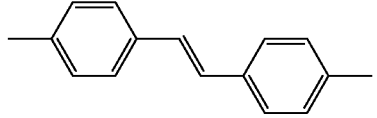

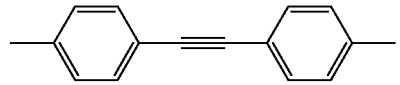

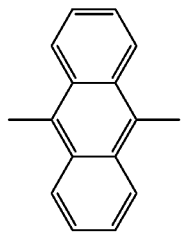

$S_1$ and $S_2$ are identical or different and are H or straight-chain, cyclic or branched alkyl, alkoxy or ester groups having from 1 to 22 carbon atoms, aryl and/or aryloxy groups having from 2 to 20 carbon atoms, where the aromatic nuclei thereof optionally bear $C_1$–$C_{22}$-alkyl, $C_1$–$C_{22}$-alkoxy, Br, Cl, F, CN, $CO_2R$, $SO_3R$ and/or $P(O)(OR)_2$ as substituents, Br, Cl, F, CN, $CO_2R$, $SO_3R$, $P(O)(OR)_2$ and $CF_3$; R is H or a straight-chain or branched alkyl group having from 1 to 22 carbon atoms or a singly charged cation;
n is a natural number from 2 to 1000.

5. A polymer as claimed in claim 1 which is a copolymer.
6. An electroluminescence material comprising the polymer as claimed in claim 1 in the form of a film applied on a substrate.

7. A process for producing an electroluminescence material, which comprises applying a polymer as claimed in claim 1 in the form of a film to a substrate.

8. An electroluminescence device comprising one or more active layers, wherein at least one of these active layers comprises a polymer as claimed in claim 1 as electroluminescence material and said electroluminescence material is between a cathode and an anode.

9. A method for providing a light source, comprising the step of: applying a voltage to a film comprising a polymer as claimed in claim 1.

10. A process for preparing a polymer of formula (I) as claimed in claim 1, which comprises polymerizing one or more compounds of the formula (II),

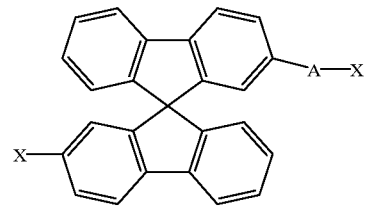

(II)

wherein
X is Cl, Br or I, and
A has the meaning given in claim 1 for the formula (I), in an inert organic solvent in the presence of $Ni^0$ at a temperature of from 30 to 150° C.

* * * * *

UNITED STATES PATENT AND TRADEMARK OFFICE
CERTIFICATE OF CORRECTION

PATENT NO. : 6,361,884 B1
DATED : March 26, 2002
INVENTOR(S) : Kreuder et al.

It is certified that error appears in the above-identified patent and that said Letters Patent is hereby corrected as shown below:

Column 14,
Line 18, after the phrase "X is" please insert -- — --

Signed and Sealed this

Fifteenth Day of April, 2003

JAMES E. ROGAN
*Director of the United States Patent and Trademark Office*